Figure 1:
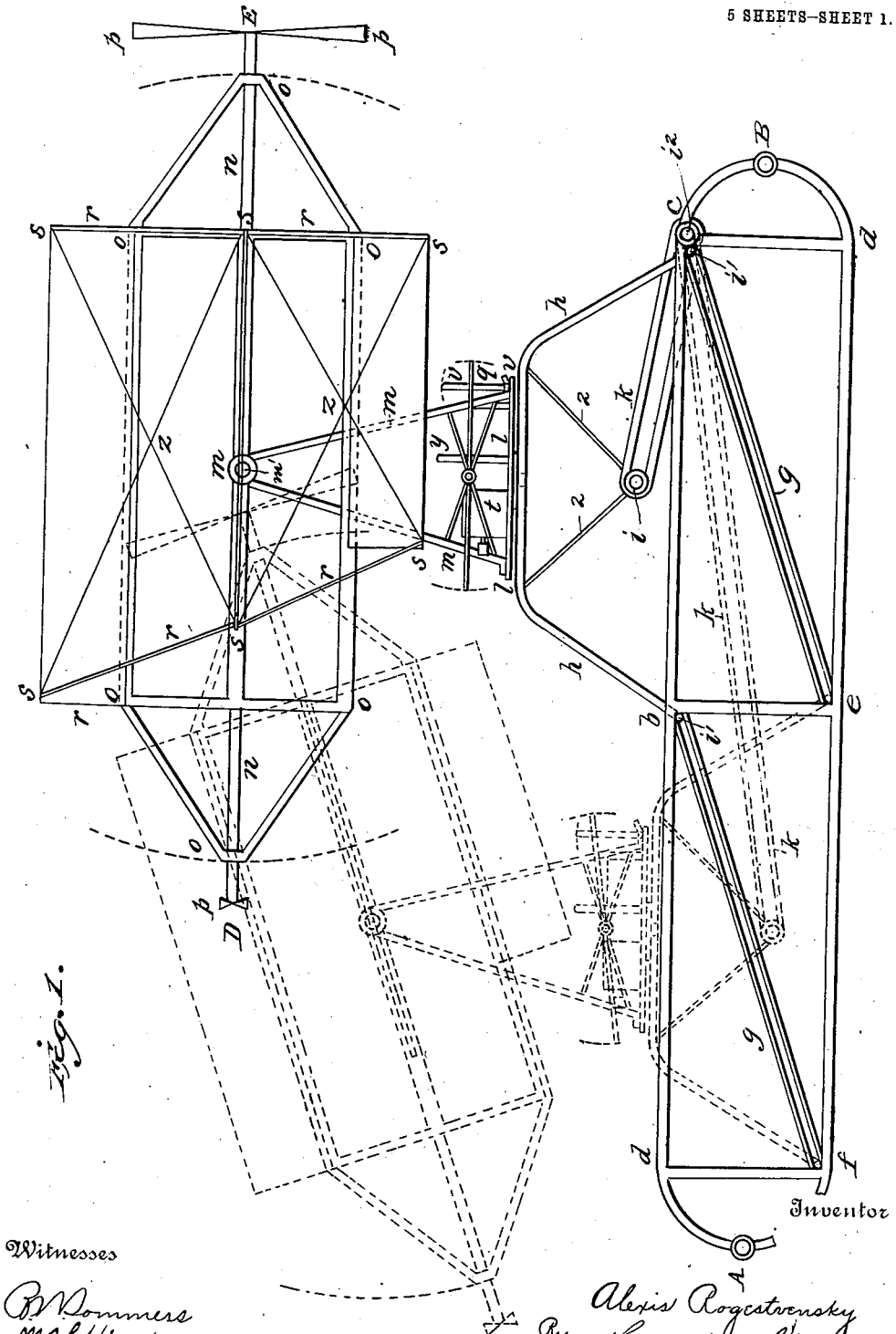

A. ROGESTVENSKY.
FLYING MACHINE.
APPLICATION FILED SEPT. 2, 1909.

1,024,102.

Patented Apr. 23, 1912.
5 SHEETS—SHEET 1.

Witnesses
B. Sommers
M. S. Higgins.

Inventor
Alexis Rogestvensky
By Henry Orth Jr.
Attorney

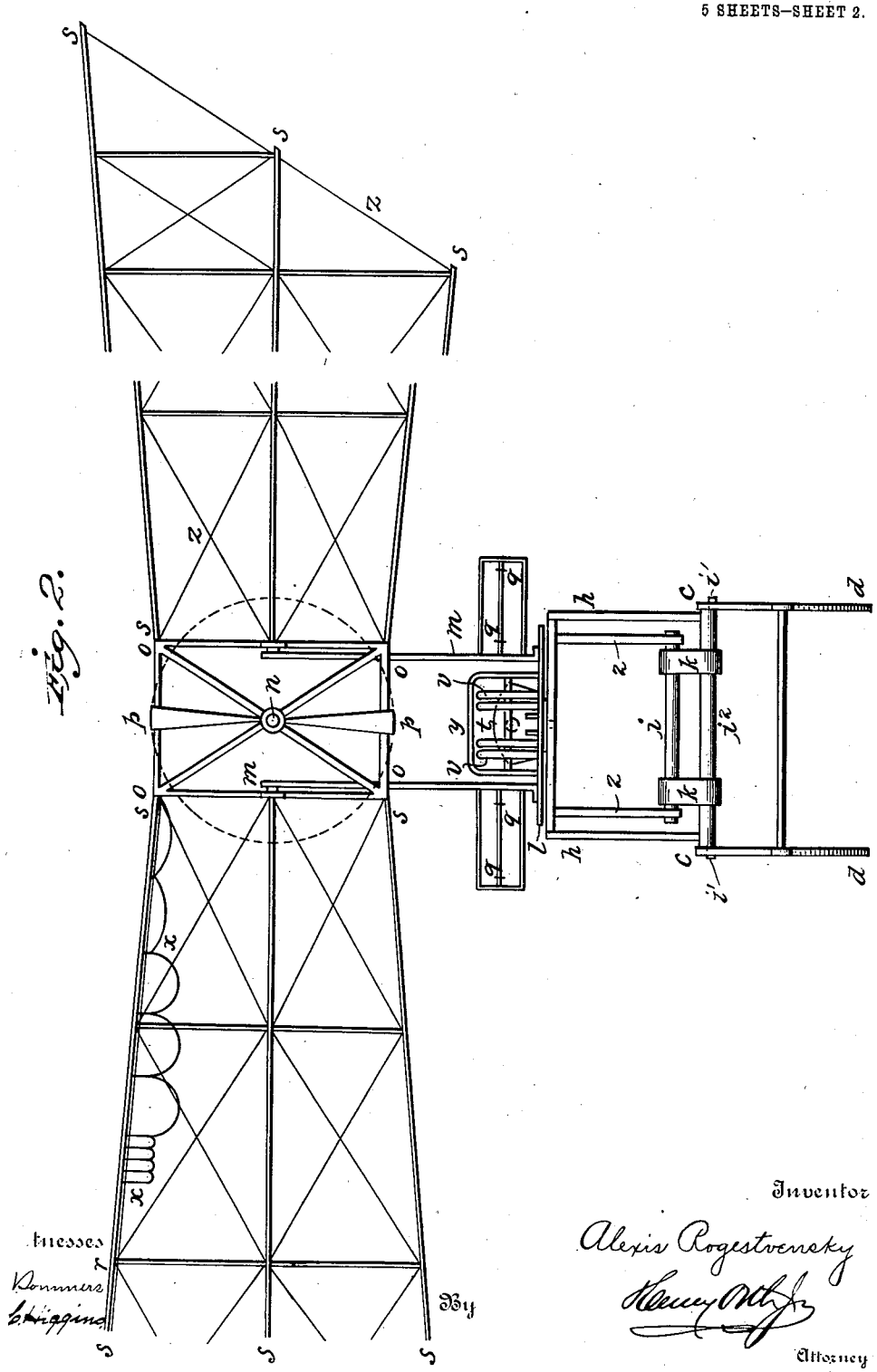

A. ROGESTVENSKY.
FLYING MACHINE.
APPLICATION FILED SEPT. 2, 1909.
1,024,102.
Patented Apr. 23, 1912.
5 SHEETS—SHEET 3.
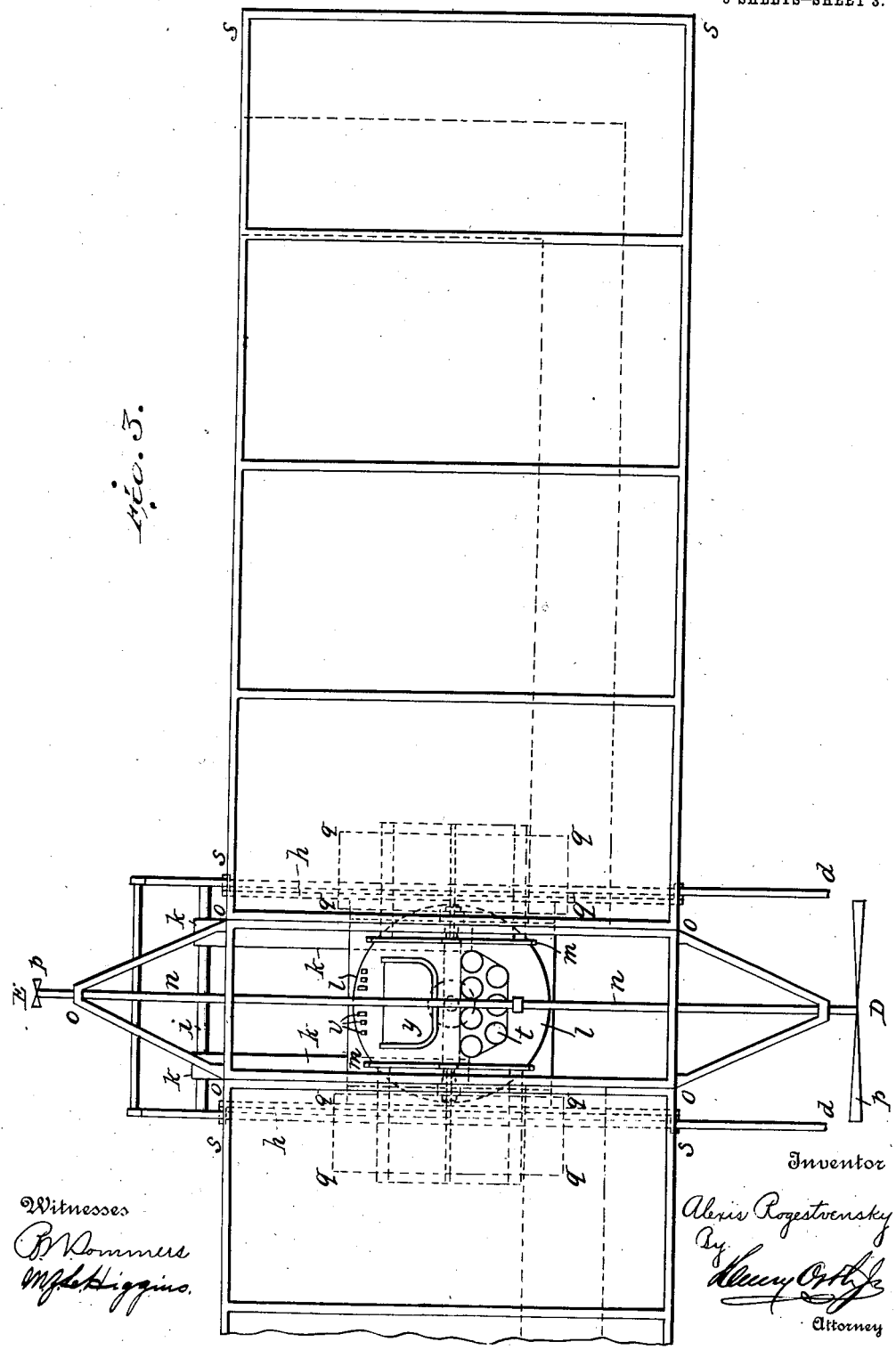

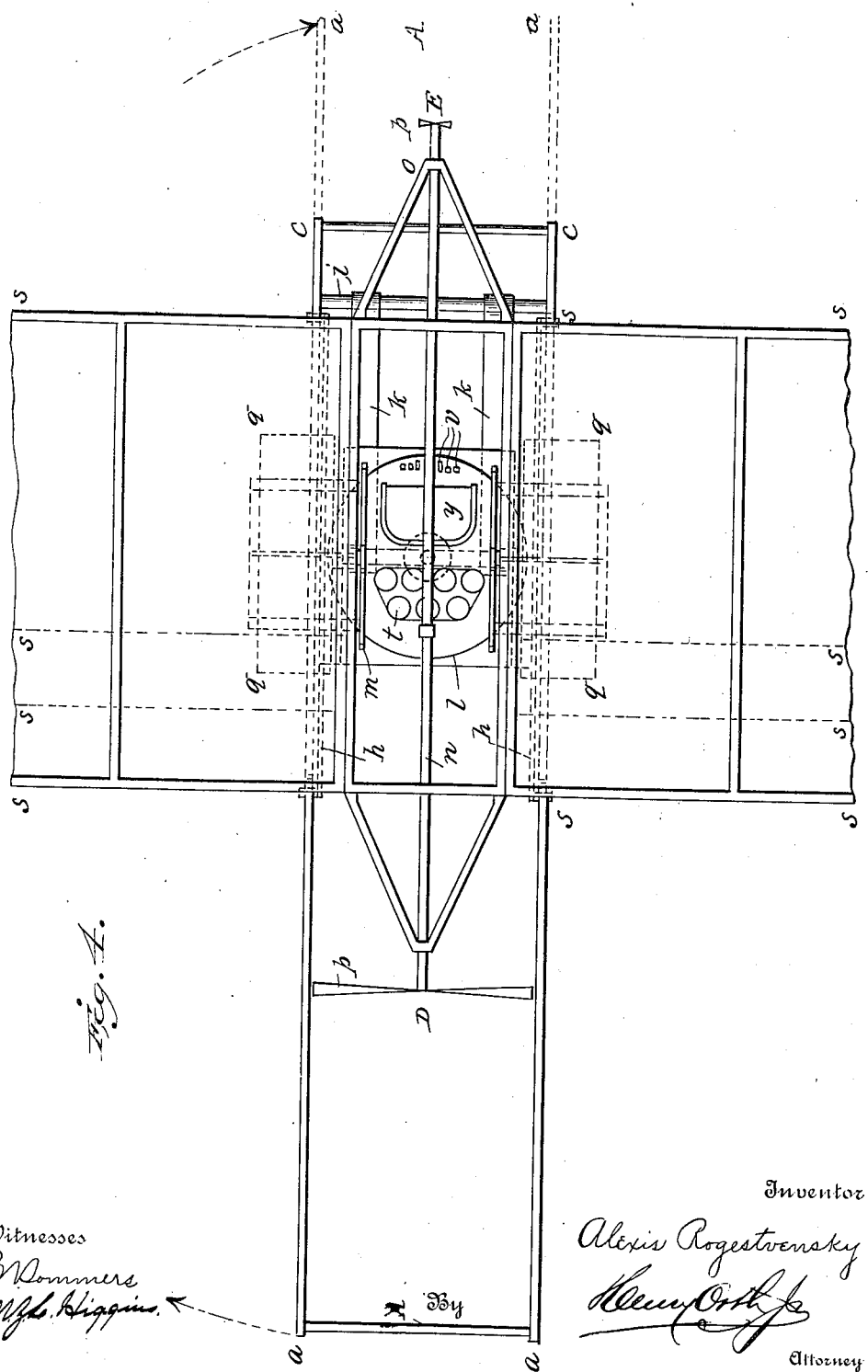

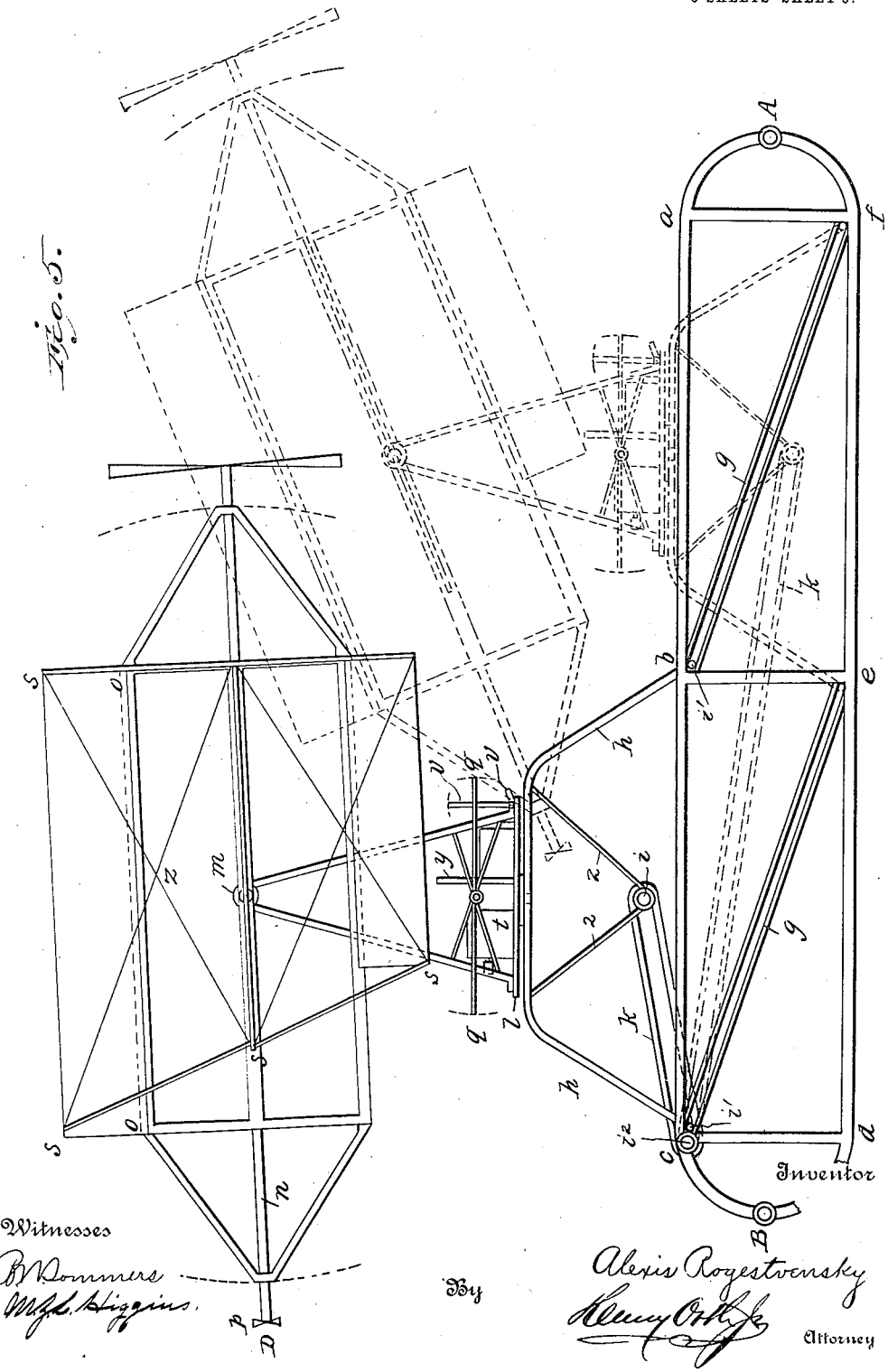

UNITED STATES PATENT OFFICE.

ALEXIS ROGESTVENSKY, OF MOSCOW, RUSSIA.

FLYING-MACHINE.

1,024,102.  Specification of Letters Patent.  Patented Apr. 23, 1912.

Application filed September 2, 1909. Serial No. 515,840.

*To all whom it may concern:*

Be it known that I, ALEXIS ROGESTVENSKY, a subject of the Emperor of Russia, residing at Moscow, Russia, have invented certain new and useful Improvements in Flying-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this application.

The invention relates to flying machines heavier than air, and has for its object the construction and arrangement thereof as will be hereinafter more particularly described and claimed.

Referring to the drawings in which like parts are similarly designated—Figure 1 is a side elevation of my flying machine; Fig. 2 is a front elevation thereof, the left wing being broken away at its end; Fig. 3 is a plan view of Fig. 2; Fig. 4 is a view similar to Fig. 3 in another position; Fig. 5 is a view similar to Fig. 1 of the machine as it is about to alight.

The machine comprises a body portion or frame, $a$, $b$, $c$, $d$, $e$, $f$, whose lower members $d$, $e$, $f$, are designed to rest on the ground, similar to the runners of a sled. On each side of the body portion are provided a pair of equally inclined guides $g$. Coöperating with the guides $g$ is a platform $h$ movable with respect to the body portion on the guides $g$. This platform has its forward and rear trunnions or pins $i'$ extending into the slots formed between the guides $g$. Below the platform $h$ is a rod $i$ held by braces 2, and this rod is connected to a similar rod $i^2$, between the members $c$, $c$ of the body, by elastic connections, rubber ropes $k$, that permit the platform $h$ to assume the dotted line position Fig. 1, with respect to the body. In lieu of the rubber ropes $k$, I may use springs, pneumatic or other devices effecting a similar function.

The flying mechanism is mounted on a turn-table $l$ on the platform $h$, and said turn-table $l$ has a pair of lateral triangular frames $m$ in the upper parts of which are mounted a casing $o$ on trunnions $m'$. The frame-work of the wings or planes $s$ is secured to the sides of the casing $o$. Through the casing $o$ in the direction D—E extends the propeller shaft $n$ having on each end thereof a screw-propeller $p$. The planes $s$ with the casing $o$ and propellers $p$ may be rotated to inclined positions on the trunnions $m'$.

On the turn-table $l$ are mounted the motor $t$, the pilot's seat $y$ and levers and pedals $v$ for controlling and operating the flying machine.

In Fig. 2 I have shown the fabric of one of the planes, the upper plane, as being arranged to be reefed at $x$. The planes $s$ and the uprights $r$ connecting them are fastened together by wires $z$.

In order to start the machine it is necessary to move the platform $h$ (Fig. 1) from the right hand end of the body, full line position, to the left hand end of the body, dotted line position, along the guides $g$, thus lowering the platform $h$ and the mechanism carried thereby. During this movement from the end B toward the end A, the elastic members or rubber ropes $k$ are stretched and so held by locking the platform in its new or starting position by suitable mechanism, not shown. The casing $o$ is now inclined parallel with the guides $g$ and the rudders $q$ at the sides of the frame $m$ below the casing $o$ are also inclined. The pilot then assumes his seat on the platform at $y$ and actuates the motors by means of pedals or levers $v$ of any suitable arrangement. The transmission from the motor $t$ to the propeller shaft is not shown, as any suitable arrangement may be used for the purpose. When the propellers $p$ have assumed a suitable speed the pilot releases the platform $h$ by means of one of the levers or pedals $v$. The ropes $k$ or equivalent resilient devices then contract, starting the platform and flying mechanism suddenly up the inclines $g$ aided by the propellers $p$, ending in the full line position Fig. 1, with a shock, due to the inertia of the moving parts assisted by the propellers and the rubber ropes $k$, so that the entire machine including the body, which is comparatively light, rises from the ground, after which the planes and propellers maintain it in the air. After the machine has risen the body and platform are turned relatively to the superstructure one-half turn, either by suitable automatic mechanism or by the pilot himself, to the full line position shown in Fig. 5, thus maintaining the direction of flight of the superstructure on the turn-table *l*. The platform *h* is preferably but not necessarily locked in its position relatively to the body. On the descent the body first strikes the ground, the platform *h* becomes unlatched by the inertia, and the platform descends to the dotted line position Fig. 5, stretching the ropes *k*, which act as shock-absorbers, and assumes its initial position with relation to the body ready for the next flight, the said platform *h* being locked or latched in this position. It is now only necessary to turn the turn-table *l* a half turn to bring the machine to the dotted line position Fig. 1, ready for the next flight.

The construction and arrangement of the platform relatively to the body permits the starting of the machine without a preliminary run along the ground.

I claim—

1. The combination with a body and inclined parallel guides thereon; of a member slidable in the guides and maintained parallel to the body, elastic means between the member and body which are contracted upon starting and distended upon alighting, and flying mechanism carried by the member.

2. The combination with a body and inclined guides thereon; of a member slidable in the guides, resilient means between the member and body, a turn-table on the member and flying mechanism on the turn-table.

In testimony whereof, I have signed my name to this specification in the presence of two subscribing witnesses.

ALEXIS ROGESTVENSKY.

Witnesses:
BORIS MAITAFF,
GUSTAVE E. HARTWIG.